(12) United States Patent
Imanishi et al.

(10) Patent No.: US 8,452,568 B2
(45) Date of Patent: May 28, 2013

(54) METHOD FOR CALIBRATING CAMERAS INSTALLED ON VEHICLE

(75) Inventors: Masayuki Imanishi, Okazaki (JP); Hirohiko Yanagawa, Chiryu (JP)

(73) Assignees: Denso Corporation, Kariya (JP); Nippon Soken, Inc., Nishio (JP)

(*) Notice: Subject to any disclaimer, the term of this patent is extended or adjusted under 35 U.S.C. 154(b) by 144 days.

(21) Appl. No.: 12/453,946

(22) Filed: May 28, 2009

(65) Prior Publication Data
US 2009/0299684 A1    Dec. 3, 2009

(30) Foreign Application Priority Data
May 30, 2008 (JP) ................. 2008-142665

(51) Int. Cl.
*G01C 7/04*    (2006.01)
(52) U.S. Cl.
USPC ............. 702/150; 702/152; 702/153; 702/94; 702/95

(58) Field of Classification Search
USPC .............. 702/150, 152, 153, 92, 94, 95, 104, 702/151, 159
See application file for complete search history.

(56) References Cited

U.S. PATENT DOCUMENTS

| | | | |
|---|---|---|---|
| 2001/0012985 A1* | 8/2001 | Okamoto et al. | 702/94 |
| 2007/0041659 A1* | 2/2007 | Nobori et al. | 382/284 |
| 2008/0181591 A1* | 7/2008 | Hongo | 396/50 |
| 2008/0231710 A1* | 9/2008 | Asari et al. | 348/187 |

FOREIGN PATENT DOCUMENTS

| | | |
|---|---|---|
| JP | A-2005-077107 | 3/2005 |
| JP | A-2007-261463 | 10/2007 |

* cited by examiner

*Primary Examiner* — Michael Nghiem
*Assistant Examiner* — Paul D Lee
(74) *Attorney, Agent, or Firm* — Posz Law Group, PLC

(57) ABSTRACT

A method for calibrating vehicle cameras is simplified by providing painted patterns on a road surface and by capturing those patterns by the cameras to be calibrated. According to a predefined positional relationship of the cameras with the painted patterns, captured images of the painted patterns are bird's-eye converted and matched with reference to calculate camera positions in a vehicle, thereby enabling an automatic calibration of camera directions and the like.

7 Claims, 12 Drawing Sheets

PAINTED PATTERN

FIG. 5A $$\begin{bmatrix} x_1 \\ y_1 \end{bmatrix} = \begin{bmatrix} \cos\theta_{roll} & -\sin\theta_{roll} \\ \sin\theta_{roll} & \cos\theta_{roll} \end{bmatrix} \cdot \begin{bmatrix} x_0 \\ y_0 \end{bmatrix} \quad \text{- - - (EQUATION 1)}$$

FIG. 5B $$a = [(f \times \sin\theta_{pitch}) + y_1 \times \cos\theta_{pitch}]$$
$$x_2 = (x_1 \times H)/a \quad \text{- - - (EQUATION 2)}$$
$$y_2 = [(f \times H \times \cos\theta_{pitch}) - (y_1 \times H \times \sin\theta_{pitch})]/a$$

FIG. 5C $$\text{Err} = e1^2 + e2^2 + e3^2 + e4^2 \quad \text{- - - (EQUATION 3)}$$

FIG. 5D $$\begin{bmatrix} x_3 \\ y_3 \end{bmatrix} = \begin{bmatrix} \cos\theta_{yawp} & -\sin\theta_{yawp} \\ \sin\theta_{yawp} & \cos\theta_{yawp} \end{bmatrix} \begin{bmatrix} x_2 \\ y_2 \end{bmatrix} \quad \text{- - - (EQUATION 4)}$$

FIG. 5E $$\begin{bmatrix} cx_p \\ cy_p \end{bmatrix} = \begin{bmatrix} xp \\ yp \end{bmatrix} + \begin{bmatrix} -x_3 \\ -y_3 \end{bmatrix} \quad \text{- - - (EQUATION 5)}$$

FIG. 5F $$\theta\text{ yaw} = \theta\text{ yawp} + \theta\text{ yawc} + \theta\text{ yawc2} \quad \text{- - - (EQUATION 6)}$$

FIG. 12A     FIG. 12B     FIG. 12C
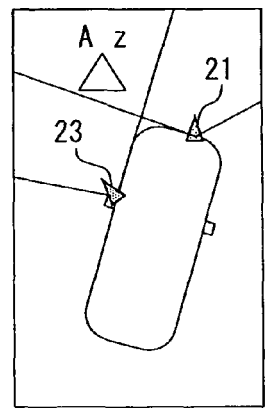
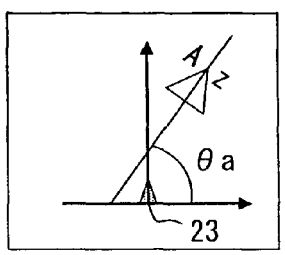
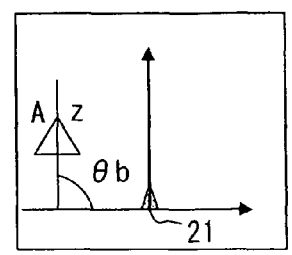
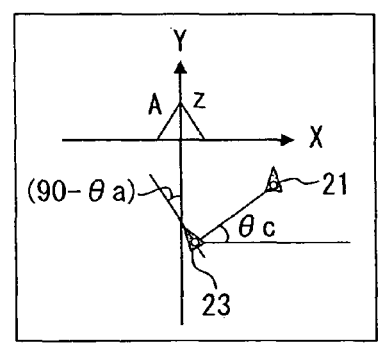
SAME CAM DIRECTION RELATIVE TO VEHICLE BODY
FIG. 12D
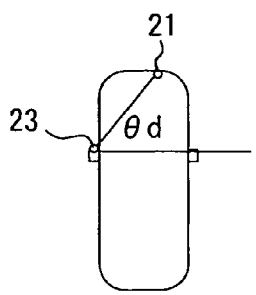
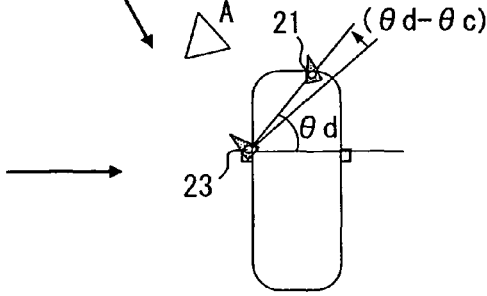
FIG. 12E     FIG. 12F

METHOD FOR CALIBRATING CAMERAS INSTALLED ON VEHICLE

CROSS REFERENCE TO RELATED APPLICATION

The present application is based on and claims the benefit of priority of Japanese Patent Application No. 2008-142665, filed on May 30, 2008, the disclosure of which is incorporated herein by reference.

FIELD OF THE INVENTION

The present disclosure generally relates to a method for calibrating vehicle cameras for use in a vehicle.

BACKGROUND INFORMATION

Conventionally, the method for calibrating vehicle cameras by capturing, for example, road surface patterns and by utilizing the camera-captured pattern images has been known and used for calculating camera position errors and for correcting those errors.

For example, Japanese patent documents JP-A-2005-77107 and JP-A-2007-261463 respectively disclose the method for calibrating the vehicle cameras. The former disclosure is about a technique that displays a reference marker image derived from a reference marker (i.e., a pseudo camera-captured reference image captured by a camera that is assumed to be having default values of external parameters) and allows manual adjustments of external parameters that make an actually-captured reference marker image matching with the pseudo image.

The latter disclosure is about a technique that uses a projector looking down on the vehicle to project a pattern around the vehicle and captures the projected pattern by the vehicle cameras for calculating the relationship between the vehicle cameras and the patterns. The technique further calculates the relationship between the vehicle and the patterns by using a camera that is closely disposed at the position of the projector. The technique uses the two relationships for calculating the relationship between the vehicle and the vehicle cameras.

However, the technique in the former disclosure demands a skill in the manual calibration of the vehicle cameras. More specifically, the vehicle having multiple cameras has to go through complicated calibration procedure, thereby taking longer time for the calibration.

Further, the technique in the latter disclosure requires a projector and a camera disposed at a certain position at an outside of the vehicle, thereby demanding both of a well-prepared environment and an investment for the equipment. The dealership that cannot afford the equipment is thus not able to perform the camera calibration on-site in shops.

SUMMARY OF THE INVENTION

In view of the above and other problems, the present disclosure provides a method for calibrating vehicle cameras in an easily-performed and cost effective manner.

In an aspect of the present disclosure, the method for calibrating multiple cameras installed on a vehicle includes: a first act of acquiring a two-dimensional image by imaging patterns around the vehicle by using multiple cameras on the vehicle, the patterns having a predetermined positional relationship with each other as a set of patterns on a road surface; a second act of performing coordinate conversion for converting coordinates of three or more points corresponding to the patterns in the two-dimensional image to the coordinates of patterns in a three dimensional space; a third act of calculating a camera position and a camera direction based on the converted coordinates of patterns; a fourth act of shifting the camera position relative to the patterns around the vehicle on the road surface by moving the patterns in the converted space to the patterns around the vehicle on the road surface based on the relative positions between each of the corresponding patterns; and a fifth act of calculating a camera posture relative to the vehicle by moving the camera position relative to the patterns around the vehicle on the road surface to be matching to a camera installation position on the vehicle.

The present disclosure uses, as a reference, multiple patterns on the road surface arranged according to a predetermined relationship. The vehicle having multiple vehicle cameras is brought close to the patterns for capturing those patterns. By applying predetermined processing to the captured image of those patterns, the vehicle cameras are calibrated.

More practically and briefly, the cameras capture the patterns for generating a two-dimensional image in the first step, and the coordinates of three points in the patterns are converted from the two-dimensional space to the three-dimensional space in the second step, and the converted coordinates are utilized to calculate the camera positions and camera directions in the third step, and the converted patterns are matched with the patterns on the road surface to inversely calculate the camera position relative to the patterns on the road surface in the fourth step, and the camera position relative to the patterns on the road surface is matched with the camera position on the vehicle to calculate the camera direction and the like relative to the vehicle body. The camera direction and the like may be, for example, represented as a depression angle of the camera, a roll angle of the camera, and/or a horizontal direction of the camera.

In other words, the calibration in the present disclosure is performed automatically instead of manually, thereby making it easy and cost effective to perform the calibration process. Further, no external equipment is required for the calibration, thereby making it easy for the dealership to implement the method.

The calibration of the cameras may also be performed by using a pattern on the road surface with three known sets of coordinates defined thereon. The vehicle is brought close to the pattern with the cameras capturing the pattern. The captured image is then processed for the calibration of the cameras.

By using the pattern with the three known sets of coordinates captured by multiple cameras, the camera positions and the like can be calculated, thereby achieving the same advantageous effects as described above.

BRIEF DESCRIPTION OF THE DRAWINGS

Objects, features, and advantages of the present disclosure will become more apparent from the following detailed description made with reference to the accompanying drawings, in which:

FIGS. 5A to 5F are equations used in the calibration process;

FIGS. 12A to 12F are illustrations of camera calibration method in a second embodiment of the present disclosure.

DETAILED DESCRIPTION

An embodiment of the present disclosure is described with reference to the drawings.

First Embodiment a) The construction of the apparatus that calibrates the cameras installed on a vehicle is described as a first embodiment of the present disclosure.

Figure 1:
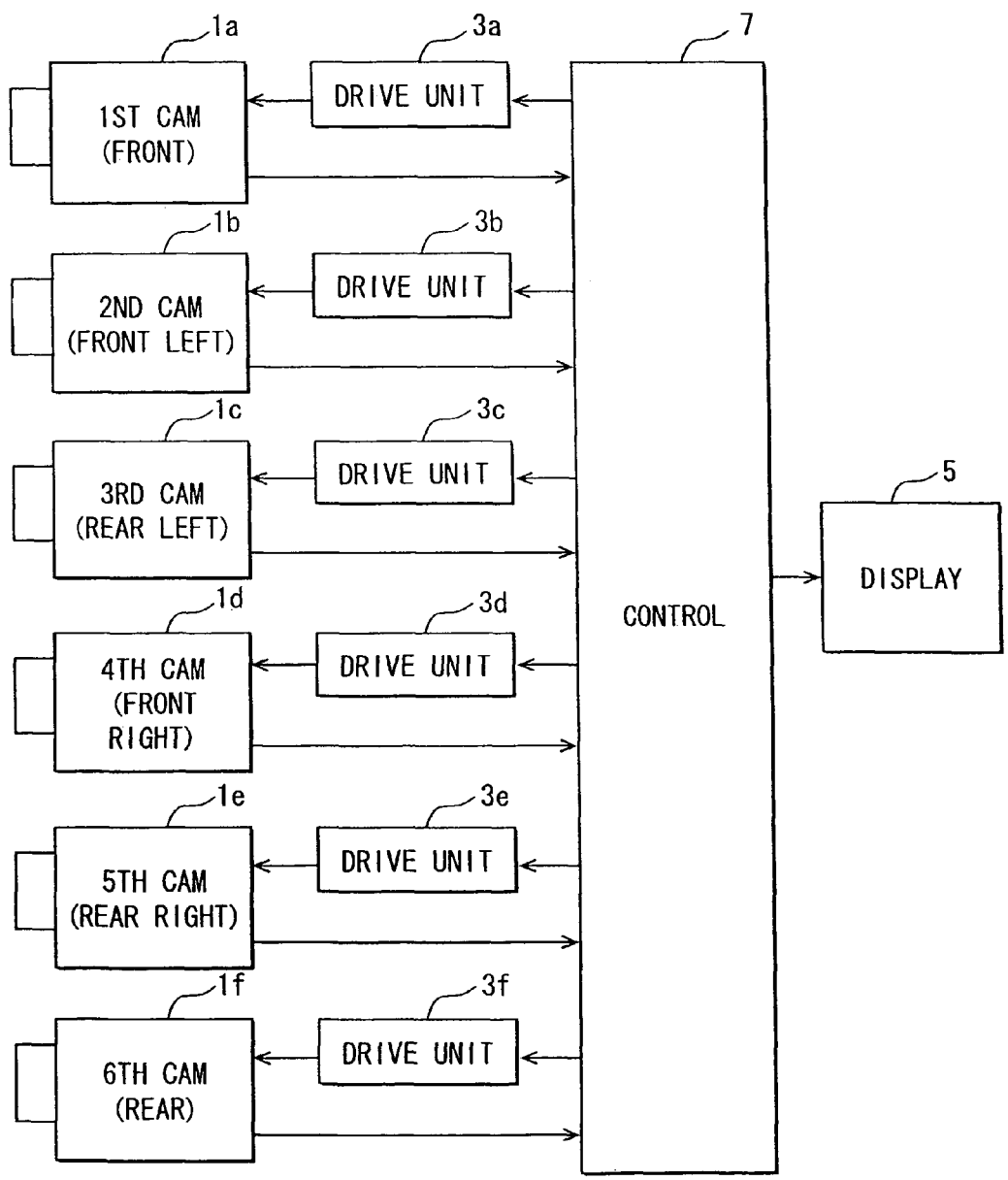
FIG. 1 is a block diagram of apparatus to perform the calibration of vehicle cameras in the first embodiment of the present disclosure.

As shown in FIG. 1, in the present embodiment, a vehicle is equipped with (a) six cameras 1a to 1f (designated as a camera 1 when they are represented as one group), (b) three motors 3a to 3f respectively driving the cameras 1a to 1f (designated as a motor 3 when they are represented as one group), (c) a display unit 5, and (d) an electronic control unit 7.

Figure 2A:
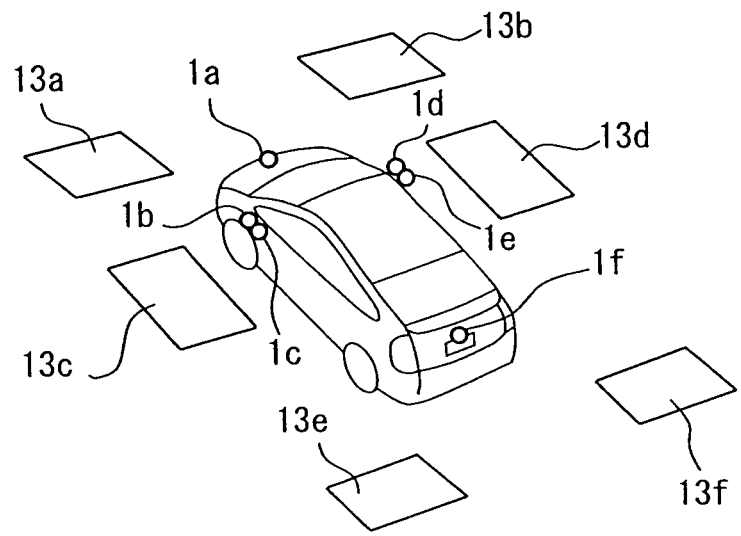
FIGS. 2A and 2B are illustrations of a relationship between a vehicle and painted patterns.
Figure 2B:
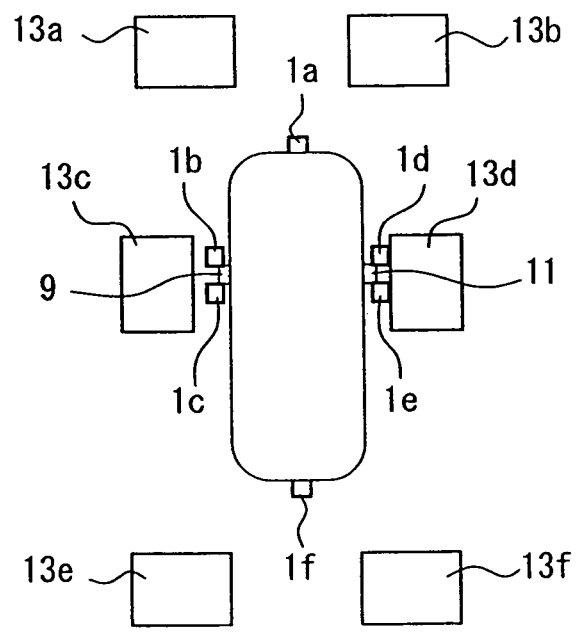

More specifically, as shown in FIGS. 2A and 2B, a first camera 1a captures a front image of the vehicle at a front center of the vehicle, a second camera 1b captures a front left image of the vehicle at a front of a left side mirror 9, a third camera 1c captures a rear left image of the vehicle at a rear of the left side mirror 9, a fourth camera 1d captures a front right image of the vehicle at a front of a right side mirror 11, a fifth camera 1e captures a rear right image of the vehicle at a rear of the right side mirror 11, and a sixth camera 1f captures a rear image of the vehicle at a rear center of the vehicle.

Further, as a reference for use in the calibration, six reference patterns 13a to 13f are painted, for example, on a surface of the road at six positions that surround the vehicle. The six patterns may be designated as a reference pattern 13 as one group, or as one representative piece of six patterns. The positions of the six patterns are described later in detail.

Each of the six patterns 13a to 13f has the same rectangular shape, with the coordinates of the four corners of the rectangular shape set in advance. The positional relationships of six patterns are also known in advance. As a result, the orientations of the patterns are pre-defined. In other words, the coordinates of the pattern 13 are defined in an original pattern coordinate system (i.e., a coordinate system of the painted patterns on the road surface) described with reference to FIG. 9. The details of the original pattern coordinate system are described later in detail.

b) The method of calibrating the vehicle cameras is described step by step in the following.

As shown in the above-mentioned FIGS. 2A and 2B, in the present embodiment, when the calibration of the camera 1 is performed, the vehicle is brought at an approximate center of the six pieces of the pattern 13. The position of the vehicle enables each of the cameras 1a to 1f to capture at least one of the patterns 13a to 13f.

Figure 3:
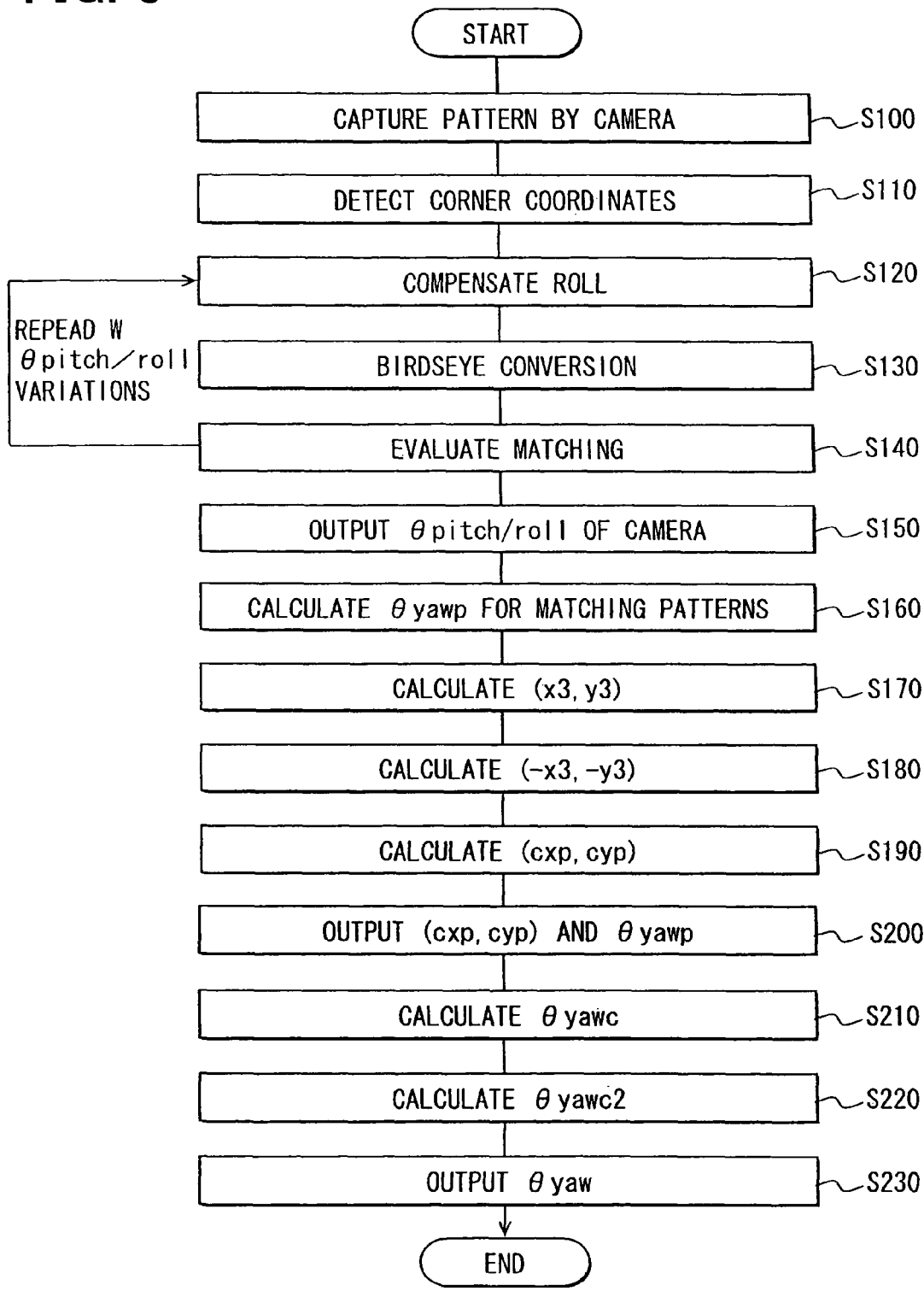
FIG. 3 is a flow chart of calibration process in the first embodiment.

Then, by performing each of the steps of a flow chart in FIG. 3, the calibration of the cameras is conducted. That is, the position of each of the cameras is corrected (a) in vertical direction of the camera (i.e., a depression angle), (b) in a rotational direction (i.e., a roll angle) about the camera/lens axis, and (c) in a horizontal direction relative to the vehicle body (i.e., the surface of the road). The correction of the camera position indicates that the error detection and its compensation relative to the initial settings.

Further, though all of the cameras 1a to 1f go through the calibration process, the following explanation may be simplified by explaining one of the six cameras 1a to 1f as a representative unit of all.

Figure 4:
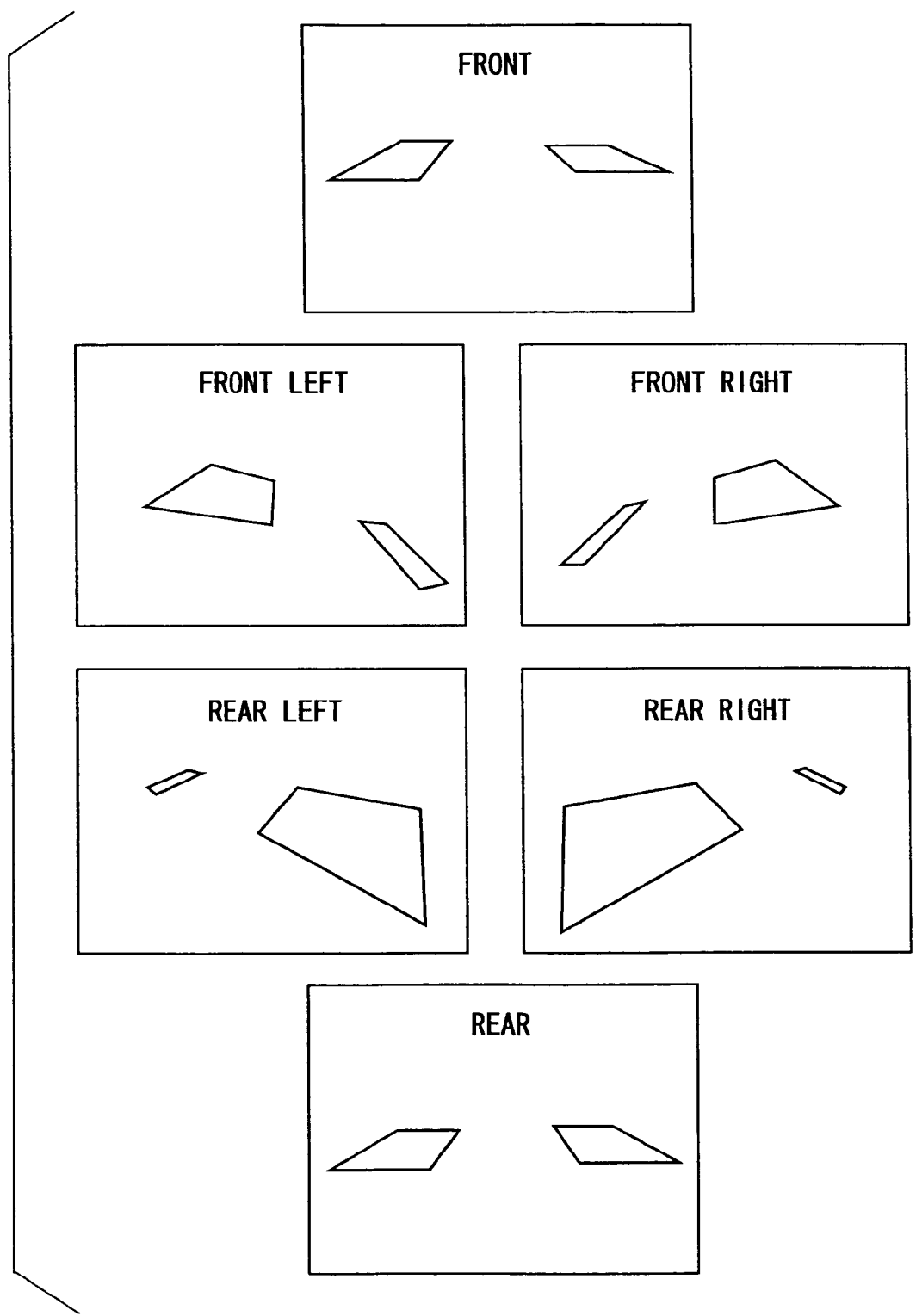
FIG. 4 is illustrations of captured images captured by respective cameras.

In S100 of the flow chart in FIG. 3, the camera 1 captures the pattern 13 painted on the road surface. The captured pattern image shows that the pattern 13 is distorted in the captured image as shown in FIG. 4.

In S110, the coordinates of the pattern 13 in two-dimensional (2D) coordinate system are calculated in the captured image. That is, the coordinates (x0, y0) of one of the four corners of the distorted rectangle in the captured image are calculated.

Then, by repeating processing in S120 to S140, the four corners of the distorted rectangle are used to calculate the coordinates of the original rectangle of the reference pattern 13 (i.e., analyzed pattern coordinates). Then, a camera direction relative to the analyzed pattern, that is, the depression angle θpitch and the roll angle θroll, is calculated.

Specifically, in S120, an equation 1 in FIG. 5A is used for roll compensation (i.e., a compensation in the roll direction about the axis of the camera 1) to calculate the compensated coordinates (x1, y1) based on the two-dimensional coordinates (x0, y0).

Then in S130, bird's-eye conversion is performed for the compensated coordinates (x1, y1) by employing an equation 2 in FIG. 5B to calculate the coordinates (x2, y2), with a certain depression angle θpitch. In this case, a factor f in the equation 2 is a camera's focus distance, and a factor H is a camera's height.

Figure 6:
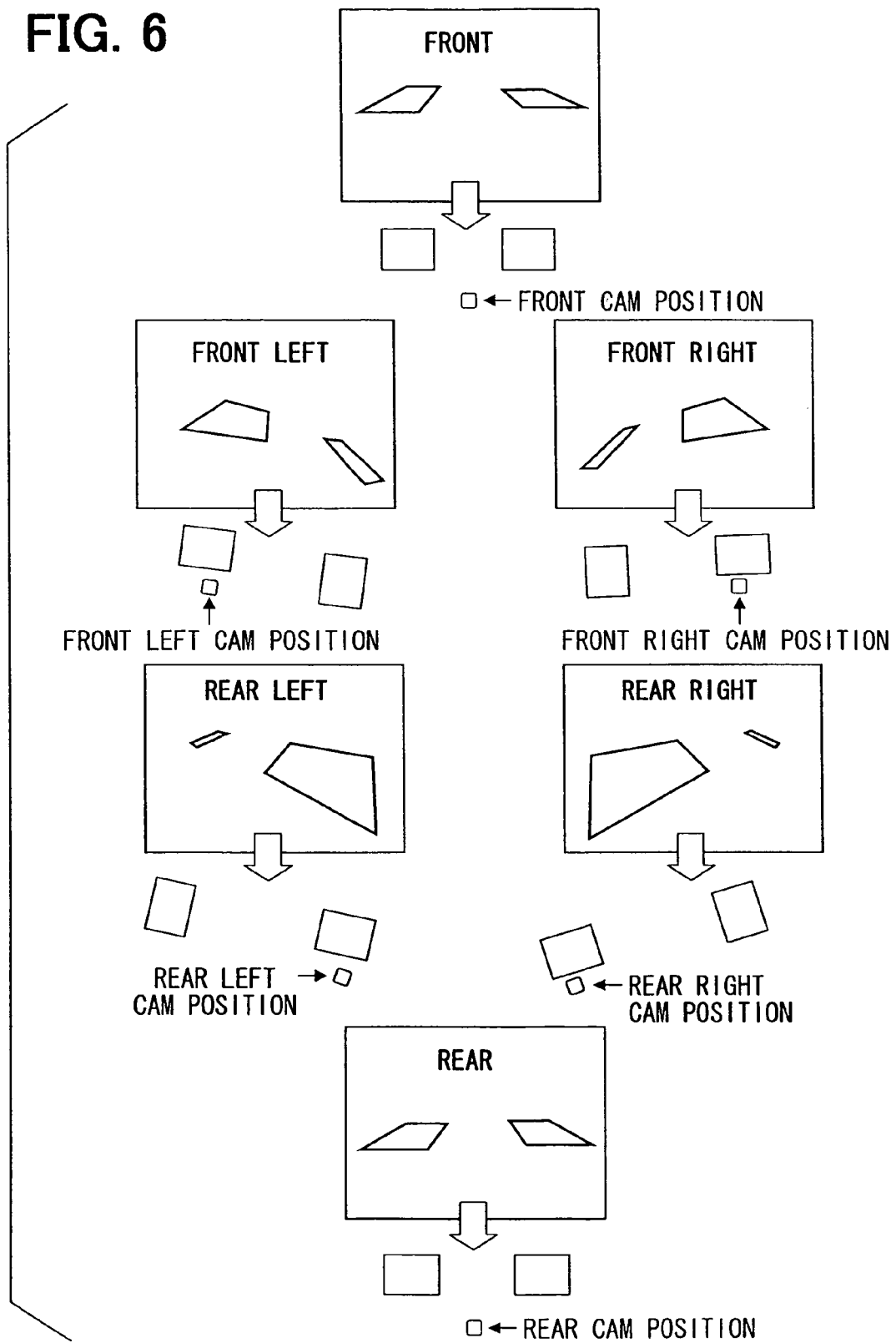
FIG. 6 is illustrations of captured images and the painted patterns on a road surface associated therewith.

The coordinates after the bird's-eye conversion are the position of the analyzed pattern with the camera position defined as its origin as shown in FIG. 6.

Figure 7:
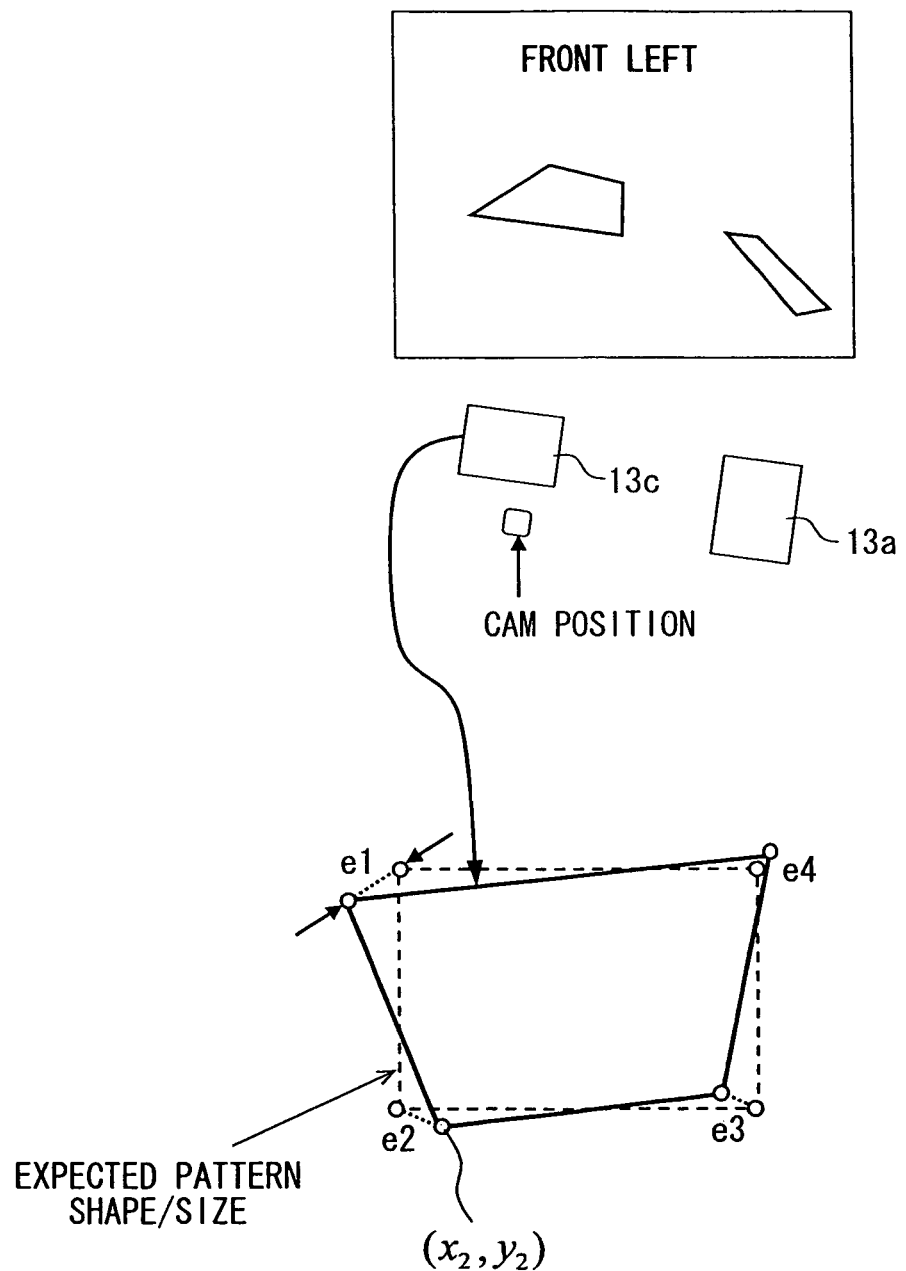
FIG. 7 is an illustration of a matching method for matching the captured image of the painted patterns with the actual patterns on the road surface.

Then, in S140, the matching evaluation is performed for the pattern 13 by employing an equation 3 in FIG. 5C. More practically, the coordinates (x2, y2) of each of the four corners of the pattern 13 after the bird's-eye conversion and the coordinates of the four corners of the original pattern 13 are respectively compared, for example, in the front left image as shown in FIG. 7, and the errors e1 to e4 of the four corners are calculated as well as the sum total of the squared errors of e1 to e4. The sum total of the squared errors is designated as Err.

In other words, in the above-mentioned S120 to 140, the roll angle θroll and the depression angle θpitch are changed bit by bit, and after each of the changes of the roll/depression angle, the Err value is calculated for the evaluation of the errors. Then, the roll angle θroll and the depression angle θpitch that minimize the Err value are selected.

As a result, the direction of camera 1 is determined as a set of the roll angle θroll and the depression angle θpitch, and, by applying the roll, angle θroll and the depression angle θpitch to the equation 2, the position of each of the cameras 1a to 1f is determined relative to the pattern 13.

Further, the Err value may preferably be calculated for each of the two patterns in FIG. 7, for the improvement of the accuracy. That is, the Err value preferably represents the total of the Err value for the left pattern 13c and the Err value for the right pattern 13a.

Then in S150, the roll angle θroll and the depression angle θpitch of the camera 1 calculated in the processing of above-mentioned S120 to S140 are output.

Figure 8A:
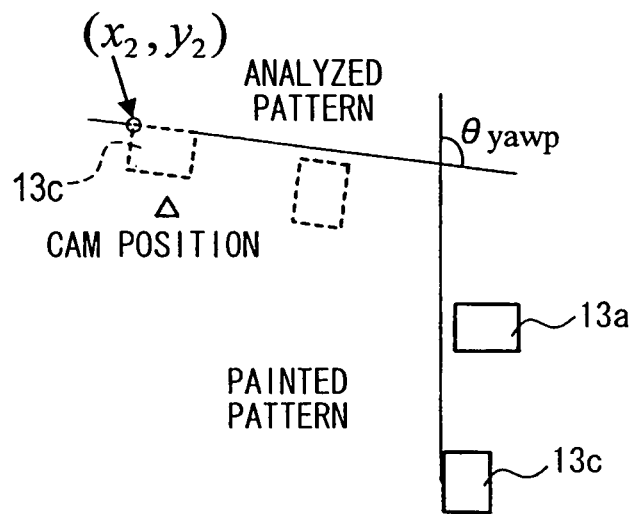
FIGS. 8A and 8B are illustrations of rotation and matching of analyzed patterns with the painted patterns.

Then, in S160, as shown in FIG. 8A, a rotation angle θyawp to match, with the corresponding pattern 13 on the road surface, the analyzed pattern that is calculated relative to the above-mentioned camera position set as the origin.

The rotation angle θyawp shown in FIG. 8A is, for example, defined as an angle between two lines, that is, an angle between an extension of an outer element of the third pattern 13c in the original pattern on the road surface and an extension of an outer element of the third pattern 13c in the analyzed pattern.

Figure 8B:
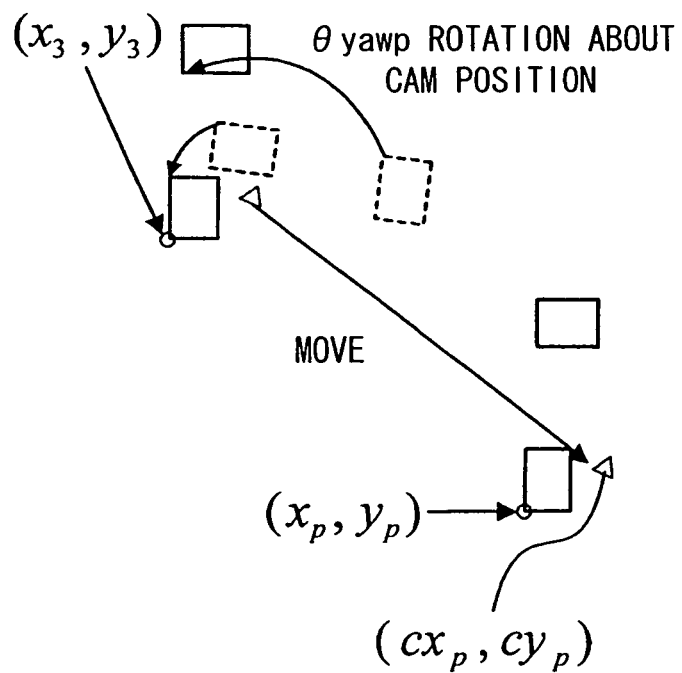

Then, in S170, as shown in FIG. 8B, the analyzed pattern is rotated about the origin that is defined as the camera position by the rotation angle θyawp by employing an equation 4 in FIG. 5D, to align with the original pattern on the road surface and to calculate the coordinates of the corners (x3, y3).

Then, in S180, camera coordinates (−x3, −y3) relative to the origin that is defined as one of the four corners of the analyzed pattern after the rotation.

Then, in S190, by employing an equation 5 in FIG. 5E, camera coordinates (cxp, cyp) in the original pattern coordinate system are calculated from the above-mentioned camera coordinates (−x3, −y3). That is, the camera coordinates (−x3, −y3) are moved by a parallel movement as shown in FIG. 8B to yield the camera coordinates (−x3, −y3).

Figure 9:
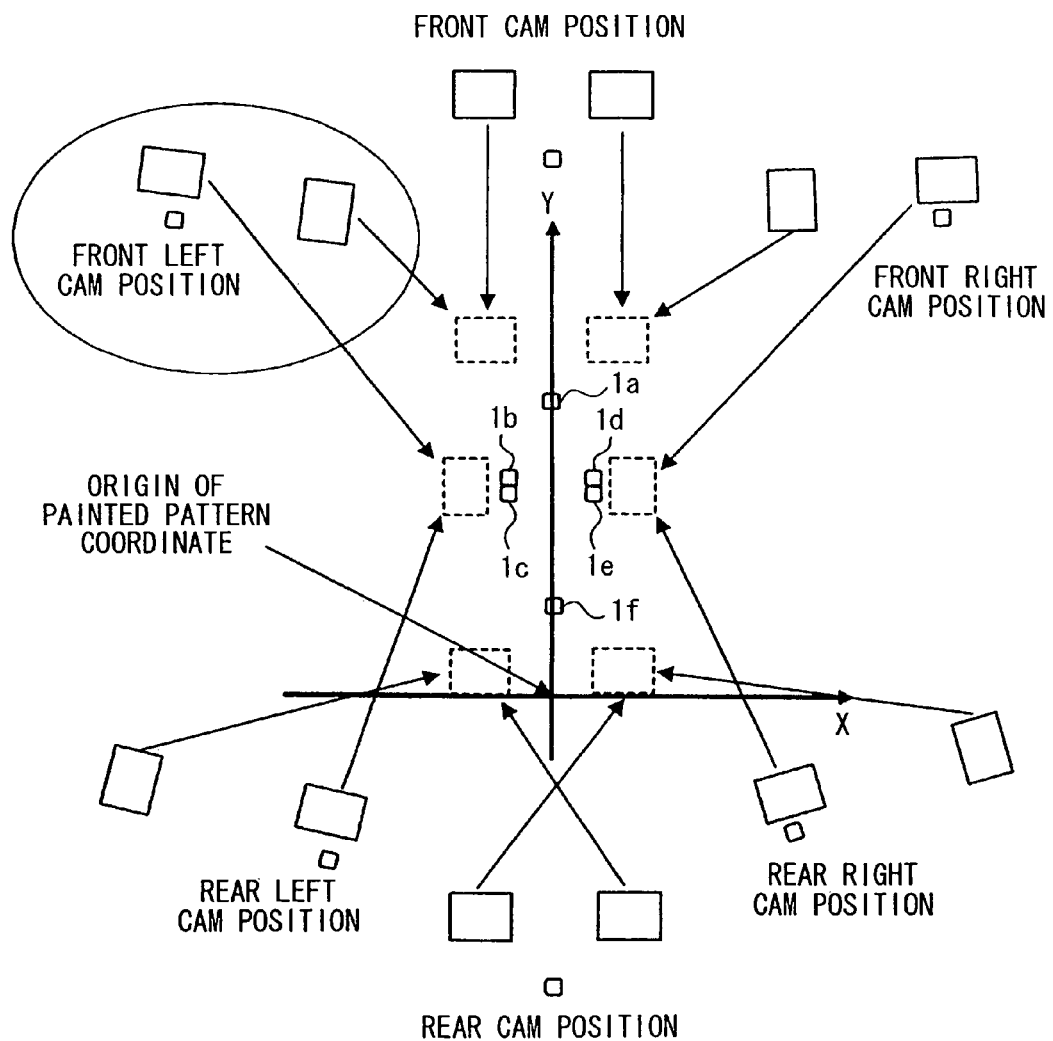
FIG. 9 is an illustration of a positional relationship between the analyzed patterns and the painted patterns.

The painted pattern coordinate system has, as shown in FIG. 9, its origin at a position that is defined as a center of a section that is drawn by extending outer (i.e., rear) elements of, for example, the fifth pattern 13e and the sixth pattern 13f. In this case, the coordinates (xp, yp) of the above-mentioned equation 5 are measured as the coordinates of the painted pattern coordinate system when the patterns 13 on the road surface are painted on the road surface.

Then, by performing the same processing for each of the cameras 1a to 1f (i.e., the processing in S160 to S190), the positional relationships between each of the cameras 1a to 1f and each of the painted patterns 13a to 13f are determined as shown in FIG. 9. Further, the illustrations in FIGS. 8A and 8B show the processing in a circle of FIG. 9.

Then, the camera coordinates (cxp, cyp) of each of the cameras 1a to 1f as well as the camera direction θyawp of each camera are output in S200. The camera direction θyawp is same as the rotation angle θyawp in FIG. 8A.

Figure 10:
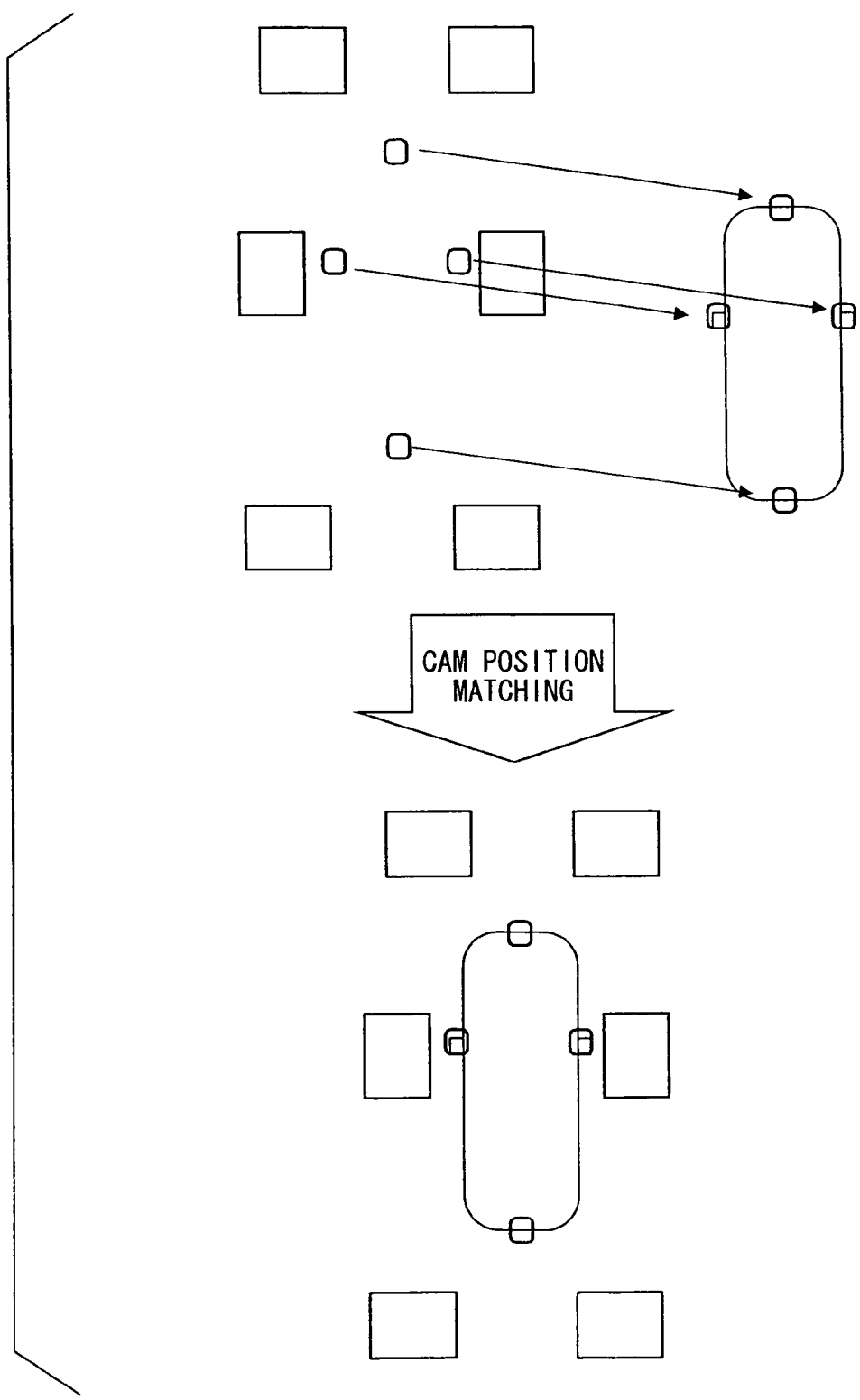
FIG. 10 is an illustration of a positional relationship between the vehicle and the painted patterns.

Therefore, as shown in FIG. 10, by moving the pattern image of the patterns 13, the detected camera positions are matched with the camera positions on the vehicle in an unambiguous manner. That is, the vehicle's orientation and the vehicle's position relative to the painted patterns on the road are clarified.

Further, in FIG. 10, the front left camera and rear rear camera are represented by one icon for the simplification purpose. The front right camera and rear right camera are represented in the same manner.

Then, in S210 to S230, the horizontal camera direction of the camera 1 is calculated relative to the vehicle, that is, relative to a horizontal plane that is in parallel with the road surface.

Figure 11:
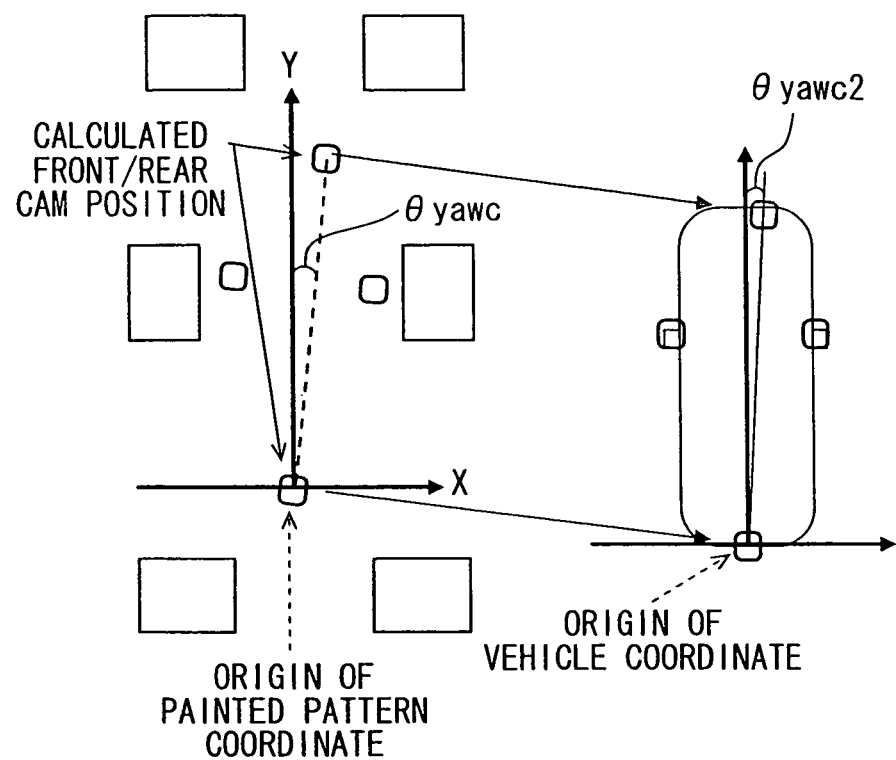
FIG. 11 is an illustration of a calculation method of a camera direction.

In the following description, for the purpose of simplification, a case where an axis that is defined as the front rear camera span direction has an angle against the Y axis of the painted pattern coordinate system as shown in FIG. 11. That is, the case where an angle θyawc is relatively large is explained.

In S210, a first difference of camera position angle θyawc is calculated in the painted pattern coordinate system that has the origin at the center of the rear end of the vehicle. The first difference of camera position angle θyawc is the angle between the line drawn as the front rear camera direction and the Y axis. In this case, the origin of the painted pattern coordinate system is moved by a predetermined amount toward the upper direction of FIG. 11.

In S220, a second difference of camera position angle θyawc2 is calculated as an angle between the line of front rear camera direction and a center line of the vehicle body (i.e., a line that symmetrically splits the vehicle body) in a vehicle coordinate system that has the origin at the center of the rear end of the vehicle. In this case, if the front and rear cameras both exist on the center line of the vehicle, the second difference of camera position angle θyawc2 becomes zero.

In S230, by employing an equation 6 in FIG. 5F, the horizontal camera angle relative to the vehicle is calculated. More practically, the first difference of camera position angle θyawc and the second difference of camera position angle θyawc2 are added to the rotation angle θyaw to yield the camera direction relative to the vehicle θyaw. Then, the direction θyaw is output, and the processing is once concluded.

Accordingly, the camera directions of each of the cameras 1b to 1f are calculated in the same manner, by calculating the difference of camera position against the Y axis of the painted pattern coordinate system. The details of the calculation are not repeated.

In summary, the camera position relative to the vehicle, that is, the camera depression angle θpitch, and the camera roll angle θroll, as well as the camera direction θyaw are calculated by conducting the above-described processing, thereby allowing to these values to be compared with the standard design values of camera installation and to be compensated accordingly by driving the motors 3a to 3f, for example.

c) As described above, in the present embodiment, by providing multiple pieces of the painted patterns 13 on the road surface, the vehicle cameras can be calibrated only by bringing the vehicle close to the patterns 13 and by capturing the patterns 13 by using the cameras 1. That is, the captured image from the cameras 1 is utilized to automatically compensate the camera position through bird's-eye conversion and other processing that accurately determines the camera positions and directions. Therefore, the calibration of the cameras can be easily performed without any specific technique or skills.

Further, in the present embodiment, the calibration of the cameras can be performed without any device that projects the patterns onto the road surface from above the vehicle, or without any device that captures the vehicle together with the patterns on the road surface, thereby making it simpler for the practitioner to perform the calibration of the cameras installed on the vehicle.

Second Embodiment

The second embodiment is explained with its focus directed to the differences from the first embodiment.

In the present embodiment, the painted pattern and the camera are combined as a minimum construction required to achieve the intended goal of the disclosure. That is, in the present embodiment, the painted pattern having three sets of coordinates and two cameras to capture the pattern are used to calibrate the camera.

As shown in FIG. 12A, one painted pattern A in a triangular shape is captured by using the first camera 21 (i.e., the front camera) and the second camera 23 (i.e., the left side camera). The camera direction is, in this case, the direction of the line that symmetrically divides the isosceles triangle. In other words, the apex of the isosceles triangle points to the camera direction.

FIG. 12B and FIG. 12C show that, the bird's-eye images from the left side camera and the front camera are used to calculate the positional relationship between the painted pattern and the front/left side cameras in the painted pattern coordinate system. The positional relationship is shown in FIG. 12D.

In FIG. 12B, an angle θa in an angle between two lines, that is, a perpendicular bisector drawn from one apex z of the painted triangle pattern and the camera direction line of the left side camera 23. In FIG. 12C, an angle θb in an angle between the following two lines, that is, a perpendicular bisector drawn from one apex z of the painted triangle pattern and the camera direction line of the front camera 21. Further, in FIG. 12D, an angle θc is a rotation angle of a line that is drawn from the left side camera 23 to the front camera 21 relative to the lateral line, that is, X direction in the painted pattern coordinate system.

Further, as shown in FIG. 12E, because the positional relationship between the front camera 21 and the left side camera 23, that is, a position angle θd of the cameras 21 and 23 relative to the lateral direction of the vehicle is already known, the camera direction relative to the vehicle body can be calculated as shown in FIG. 12F by matching the position of the left side camera 23 in FIG. 12E with the position of the left side camera 23 in FIG. 12D, for example.

More practically, by rotating the line from the camera 23 to the camera 21 by an angle (θd−θc), the positional relationship shown in FIG. 12A can be achieved.

By going through the above procedure, the camera direction relative to the vehicle body is calculated, thereby enabling the calibration (in this case, the calibration of the direction only) of each of the two cameras 21 and 23.

Although the present disclosure has been fully described in connection with preferred embodiment thereof with reference to the accompanying drawings, it is to be noted that various changes and modifications will become apparent to those skilled in the art.

Such changes, modifications, and/or summarized scheme are to be understood as being within the scope of the present disclosure as defined by appended claims.

What is claimed is:

1. A method, implemented by an electronic control unit in an camera calibrating apparatus, for calibrating multiple cameras installed on a vehicle, the method comprising:
  a first act of acquiring a two-dimensional image by imaging a reference pattern around the vehicle by using the multiple cameras installed on the vehicle, the reference pattern including multiple pattern pieces disposed on a road surface, each of the multiple pattern pieces having geometric shape with at least three sides, and having predetermined positional relationships with each other and predetermined original coordinates corresponding to points of the geometric shape, wherein each of the cameras image at least two of the multiple pattern pieces in the two-dimensional image of the reference pattern;
  a second act of performing, by the electronic control unit, coordinate conversion for converting coordinates of three or more points for each of the multiple pattern pieces of the reference pattern in the two-dimensional image to coordinates of an analyzed pattern, by combining a roll compensation and a bird's-eye conversion based on a depression angle and a roll angle of each of the multiple cameras, wherein an origin of the coordinates of the analyzed pattern after coordinate conversion is set to camera positions of each of the multiple cameras;
  a third act of determining, by the electronic control unit, the depression angle and the roll angle that minimize distortion of the analyzed pattern based on the converted coordinates of the analyzed pattern and the coordinates of the reference pattern to have the analyzed pattern resemble the geometric shape of the pattern piece, wherein the determination of the depression angle and the roll angle is performed by repeating the second act with the depression angle and the roll angle changed in repeating of the second act;
  a fourth act of calculating, by the electronic control unit, the coordinates of each of the camera positions in a coordinate system of the reference pattern on the road surface based on (a) calculation of a rotation angle of the camera in a horizontal direction for matching the analyzed pattern to relative positions of the multiple pattern pieces in the reference pattern and (b) calculation of the rotated coordinates of the analyzed pattern by the calculated rotation angle in the horizontal direction; and
  a fifth act of calculating, by the electronic control unit, the rotation angle of each of the cameras relative to the vehicle, based on (a) the rotation angle of the camera in the horizontal direction and (b) a relationship between (i) the coordinates of the camera position in a reference pattern coordinate system and (ii) the coordinates of the camera position in a vehicle coordinate system.

2. The camera calibration method of claim 1, wherein the third act includes determining, by the electronic control unit, the depression angle and the roll angle based on a matching evaluation that minimizes errors between the multiple sets of coordinates of the analyzed pattern and the corresponding set of coordinates of the reference pattern on the road surface.

3. The camera calibration method of claim 1, wherein the first through fifth acts do not require obtaining information as to any positional relationship between the vehicle and the reference pattern, including the multiple pattern pieces, and
  the first act requires that the vehicle be driven close enough to the reference pattern such that each camera can image the at least two of the multiple pattern pieces in the two-dimensional image of the reference pattern.

4. The camera calibration method of claim 1, wherein the first through fifth acts do not require that the vehicle and the reference pattern, including the multiple pattern pieces, be in any particular positional relationship as to each other, and
  the first act requires that the vehicle be driven close enough to the reference pattern such that each camera can image the at least two of the multiple pattern pieces in the two-dimensional image of the reference pattern.

5. A camera calibrating system for use in a vehicle, comprising:
  multiple cameras installed on the vehicle that are configured to acquire through imaging, in a first act, a two-dimensional image of a reference pattern around the vehicle, the reference pattern including multiple pattern pieces disposed on a road surface and having predetermined positional relationships with each other, each of the multiple pattern pieces having a geometric shape with at least three sides and predetermined original coordinates corresponding to points of the geometric shape, wherein each of the cameras image at least two of the pattern pieces in the two-dimensional image of the reference pattern; and an electronic control unit that is configured to calibrate the multiple cameras installed on the vehicle by:

performing, in a second act, coordinate conversion of three or more points for each of the multiple pattern pieces of the reference pattern in the two-dimensional image to coordinates of an analyzed pattern, by combining a roll compensation and a bird's-eye conversion based on a depression angle and a roll angle of each of the multiple cameras, wherein an origin of the coordinates of the analyzed pattern after coordinate conversion is set to camera positions of each of the multiple cameras;

determining, in a third act, the depression angle and the roll angle that minimize distortion of the analyzed pattern based on the converted coordinates of the analyzed pattern and the coordinates of the reference pattern to have the analyzed pattern resemble the geometric shape of the pattern piece, wherein determining the depression angle and the roll angle is performed by repeating the second act with the depression angle and the roll angle changed while repeating of the second act;

calculating, in a fourth act, the coordinates of each of the camera positions in a coordinate system of the reference pattern on the road surface based on (a) calculation of a rotation angle of the camera in a horizontal direction for matching the analyzed pattern to relative positions of the multiple pattern pieces in the reference pattern and (b) calculation of the rotated coordinates of the analyzed pattern by the calculated rotation angle in the horizontal direction; and calculating, in a fifth act, the rotation angle of each of the multiple cameras relative to the vehicle, based on (a) the rotation angle of the camera in the horizontal direction and (b) a relationship between (i) the coordinates of the camera position in a reference pattern coordinate system and (ii) the coordinates of the camera position in a vehicle coordinate system.

6. The camera calibrating system of claim 5, wherein the first through fifth acts do not require obtaining information as to any positional relationship between the vehicle and the reference pattern, including the multiple pattern pieces, and the first act requires that the vehicle be driven close enough to the reference pattern such that each camera can image the at least two of the multiple pattern pieces in the two-dimensional image of the reference pattern.

7. The camera calibrating system of claim 5, wherein the first through fifth acts do not require that the vehicle and the reference pattern, including the multiple pattern pieces, be in any particular positional relationship as to each other, and the first act requires that the vehicle be driven close enough to the reference pattern such that each camera can image the at least two of the multiple pattern pieces in the two-dimensional image of the reference pattern.

* * * * *